United States Patent
Roth et al.

[11] Patent Number: 5,294,386
[45] Date of Patent: Mar. 15, 1994

[54] PROCESS FOR THE PRODUCTION OF PADDING OF POLYURETHANE FOAM CAST IN SITU IN A TEXTILE COVERING

[75] Inventors: Jacques Roth, Strasbourg; Manigold Alain, Romanswiller; Daniel Schmitt, Berstett, all of France

[73] Assignee: Roth Freres, S.A., Strasbourg, France

[21] Appl. No.: 719,915

[22] Filed: Jun. 24, 1991

[30] Foreign Application Priority Data

Jun. 29, 1990 [FR] France .................. 90 08439

[51] Int. Cl.⁵ .................................. B29C 67/22
[52] U.S. Cl. ..................... 264/46.6; 101/257; 101/46.8
[58] Field of Search .......... 264/45.1, 46.4, 46.6, 264/46.8, 101, 257; 156/79

[56] References Cited

U.S. PATENT DOCUMENTS

| | | |
|---|---|---|
| 3,258,511 | 6/1966 | McGregor, Jr. |
| 3,616,470 | 11/1971 | Young et al. |
| 4,002,520 | 1/1977 | Fenton ................ 264/46.8 |
| 4,116,736 | 9/1978 | Sanson et al. ....... 264/46.8 |
| 4,247,347 | 1/1981 | Lischer et al. ...... 264/46.8 |
| 4,247,348 | 1/1981 | Lischer .............. 264/46.8 |
| 4,264,386 | 4/1981 | Sears, Jr. et al. ... 264/257 |
| 4,287,143 | 9/1981 | Sears, Jr. |
| 4,547,920 | 10/1985 | Hulsebusch et al. .. 264/46.8 |
| 4,559,094 | 12/1985 | Hostetler et al. ..... 264/46.8 |
| 4,938,912 | 7/1990 | Pelzer ................ 264/46.8 |

FOREIGN PATENT DOCUMENTS

| | | |
|---|---|---|
| 0140623 | 5/1985 | European Pat. Off. |
| 0141556 | 5/1985 | European Pat. Off. |
| 0227202 | 7/1987 | European Pat. Off. |
| 0376671 | 7/1990 | European Pat. Off. |
| 3728923 | 3/1989 | Fed. Rep. of Germany |
| 2202774 | 3/1977 | France |
| WO85/04131 | 9/1985 | World Int. Prop. O. |

*Primary Examiner*—Allan R. Kuhns

[57] ABSTRACT

Cushions are produced from padding of polyurethane foam cast in situ in a textile covering. There are disposed successively in a mold (1) a textile (2) overlaid by a foam sheet (3) with cells that are open and communicating, and then a fluid-tight film (4), e.g. of glue. The composite (5) thus obtained, adapted to constitute the covering of the cushion, is held against the internal wall (6) of the mold (1) by suction, and then there is cast in the mold (1) a foaming mixture of polyurethane (7) which expands and hardens after closing of the mold (1). Finally, a microperforation of the fluid-tight film (4) is effected, thereby to confer on it good permeability to water vapor and permitting also to generate, by the effect of suction, an underpressure in the foam (8) in the course of hardening, such that the resulting padding of foam (8) will have, after polymerization and demolding, constituent cells (11) that are open and communicating. This microperforation is effected by heating the composite (5) to the softening point of the film of glue (4) and by aspiration under vacuum at the level of the internal wall (6) of the mold (1), giving rise to the penetration by suction of the softened film of glue (4) into the surface cells of the sheet of foam (3) and, as a result, the obtention of substantially point elongations of the film of glue (4) leading to microruptures in this latter and permitting also to produce a unification by thermobonding of the film of glue (4) with the sheet of foam (3).

4 Claims, 3 Drawing Sheets

PROCESS FOR THE PRODUCTION OF PADDING OF POLYURETHANE FOAM CAST IN SITU IN A TEXTILE COVERING

FIELD OF THE INVENTION

The present invention has for its object a process for the production of padding of polyurethane foam cast in situ from a foaming mixture in a textile covering and a cushion obtained by the practice of this process.

BACKGROUND OF THE INVENTION

At present, there are principally used two different processes to cast a foaming mixture of polyurethane in a textile cover previously disposed in a mold.

A first known process consists in first applying to the textile a fluid type barrier constituted by a rubber, polyurethane or like film, preventing the foaming mixture from penetrating and passing through the mesh of the textile.

Moreover, the fluid-tight film permits maintaining the cover in the mold by suction. But the film is not structurally modified during ultimate heating to cure the foam.

The principal drawback of this process is therefore that, due to the fluid tightness of the textile cushion cover resulting from this film, a large part of the comfort of the cushion is lost, particularly because of perspiration from the user.

The second known process consists in applying to the textile, as a barrier, a sheet of flexible polyurethane foam previously cut off from a block of the foam.

But this process is not satisfactory unless the foam sheet is of microcellular structure, that is very little permeable to air thanks to the cells which are substantially closed and substantially do not communicate with each other. Thus, in this case, the foaming mixture does not penetrate too greatly through the cells of this foam sheet, thereby partially avoiding the effect of hardening, known as the "cardboard effect", resulting from densification of the foaming mixture. Nevertheless, the permeability of the foam sheet is extremely difficult to control during fabrication of the blocks, whereby a large portion of the production is defective in spite of all efforts because of too great permeability of the sheet of foam, which gives rise to too much penetration of the foaming mixture into the cells of the sheet of microcellular foam, resulting precisely, upon densification of the foaming mixture, in the formation of a crust called "cardboard effect", which is disagreeable to the user from a standpoint of comfort, and disastrous for the manufacturer from an economic standpoint because of the waste of a large part of the foaming mixture uselessly lost through densification and crust formation.

There can also be used, in place of a sheet of microcellular foam, a sheet of flexible foam which has first been hot calendered. But the same drawbacks persist with hardly any improvement.

Moreover, the maintenance of the textile covering within the mold obtained ideally by holding said covering against the internal wall of the mold by suction, is rendered impossible if the barrier is constituted by a sheet of microcellular foam or a sheet of calendared foam, the two being porous and hence permeable to air, negating the effect of suction produced for example by the generation of a vacuum.

SUMMARY OF THE INVENTION

The present invention has for its object to overcome the recited drawbacks and, more particularly has for its object to obtain a cushion, cast in situ in a textile covering, enjoying on the one hand the advantages of the impermeable film technique, namely no "cardboard effect", nor loss of material due to the formation of a crust, by densification as well as the possibility of positioning and maintaining the textile covering in the mold by suction, and, on the other hand, also the advantages of the porous barrier technique, namely permeability to water vapor giving excellent comfort to said cushion. Moreover, the present invention also aims to improve the molding of foam cushions of polyurethane cast in situ in a textile covering, by suppressing the mechanical opening of the cells of the foam after demolding said cushions.

To this end, the present invention has for its object a process for the production of cushions of polyurethane foam cast in situ in a textile covering, characterized in that it consists in disposing successively in a mold a textile superposed on a sheet of foam whose cells are open and communicating, then a fluid-tight film, drawing by suction the complex thus obtained, adapted to constitute the cover of a cushion, against the internal wall of the mold, then casting in said mold a foaming mixture of polyurethane which expands and solidifies after closing of said mold, and, finally, effecting microperforation of said fluid-tight film thus giving it a good permeability to water vapor and also the generation, by suction, of an underpressure in the mold in the course of setting, such that the resulting foam cushion will have, after polymerization and demolding, constituent cells that are open and communicating.

BRIEF DESCRIPTION OF THE DRAWINGS

The invention will be better understood from the following description, which relates to a preferred embodiment, given by way of non-limiting example, and explained with reference to the accompanying schematic drawings, in which.

DETAILED DESCRIPTION OF THE INVENTION

Figure 3A:
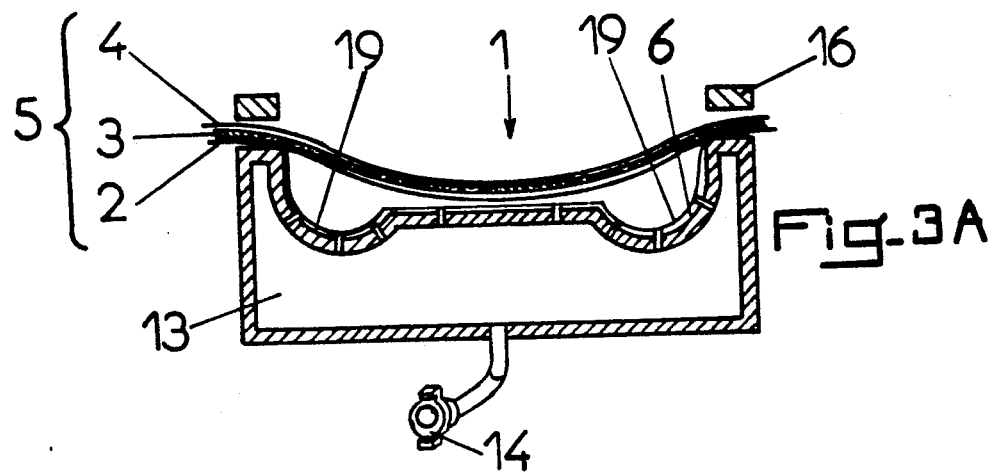
FIG. 3 (FIGS. 3A, 3B and 3C) shows in side elevational cross sectional views the principal stages of the process according to the invention.
Figure 3B:
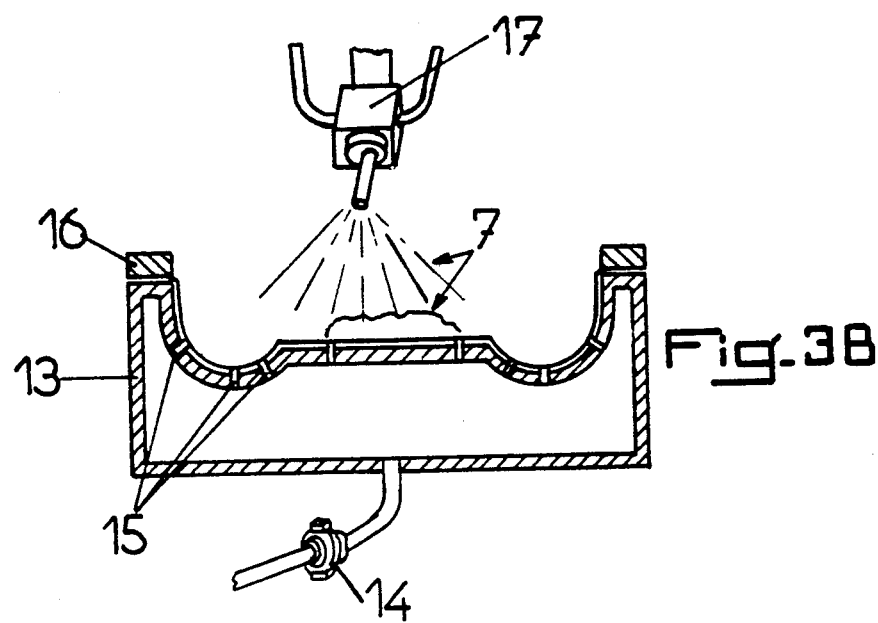
Figure 3C:
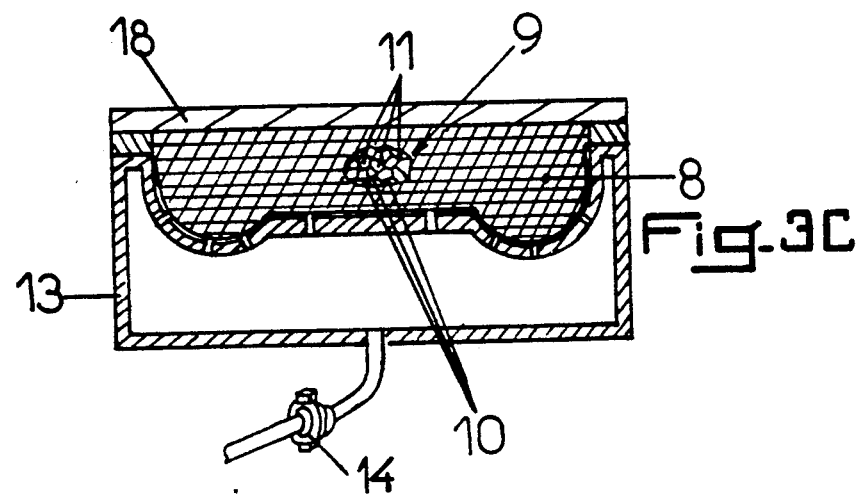

According to the invention, and as shown in FIGS. 3A, 3B and 3C, the process of the production of pads of polyurethane foam consists in disposing successively in a mold 1 a textile 2 overlaid with a sheet of foam 3 with cells that are open and communicating, then a fluid-tight film 4, drawing by suction the composite 5 thus obtained, adapted to constitute the cover of the cushion, against the internal wall 6 of the mold 1, then casting within said mold 1 a foaming mixture of polyurethane 7 which expands and hardens after closing said mold and, finally, effecting microperforation of said fluid-tight film 4 which thus gives to it good permeability to water vapor and permits also generating, by the effect of suction, a vacuum in mold 8 in the course of hardening, such that the resulting foam cushion 8 has, after polymerization and demolding, constituent cells which are open and communicating.

Figure 1:
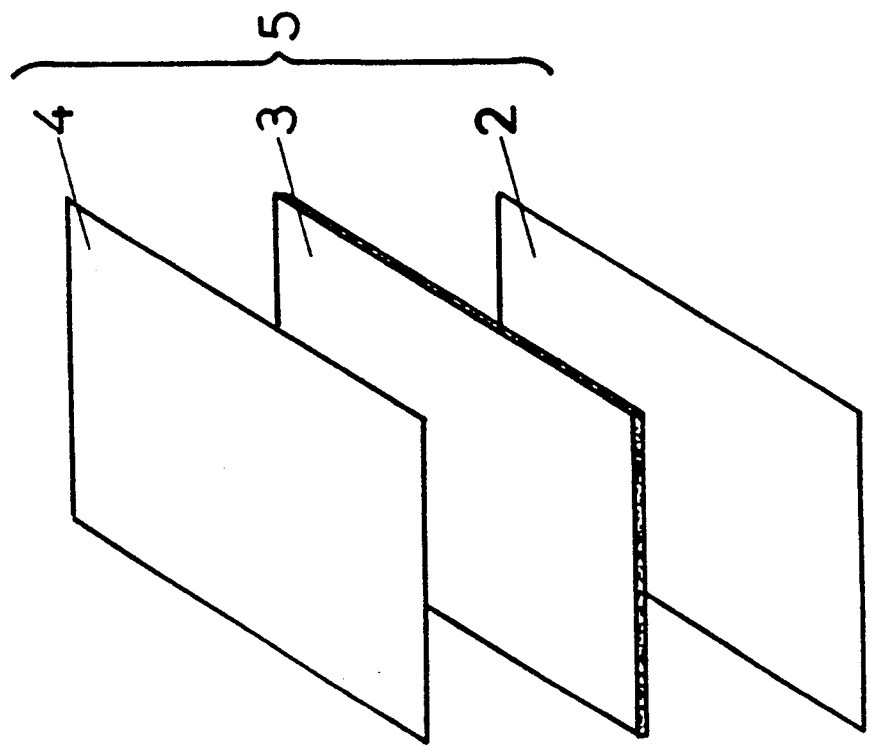
FIG. 1 is an exploded perspective view of the composite adapted to constitute the cover of the cushion.

According to a first characteristic of the invention shown in FIG. 1 of the accompanying drawings, the composite 5 is composed, on the one hand, of a woven, knit or non-woven textile 2, on the other hand, by a sheet of polyurethane foam 3 with cells that are open and communicating, previously applied, by cementing or thermobonding, on said textile 2 and, finally, of a fluid-tight film of cement 4, held against said foam sheet 3 by suction resulting from aspiration under vacuum, this latter also permitting applying intimately said composite 5 against the internal wall 6 of the mold 1 and to hold thus its position in said mold 1, particularly during casting.

According to a characteristic of the invention, the microperforation of the fluid-tight film of glue 4 is obtained, after complete expansion of the polyurethane foam 8 in the mold 1, by the concomitant effects, on the one hand, of heating of composite 5 to soften said glue film 4 and, on the other hand, by aspiration under vacuum at the level of the internal wall 6 of the mold 1, involving the penetration under suction of said film of softened glue 4, into the surface cells of the foam sheet 3 and, as a result, the obtention of substantial point stretching of said film of glue 4, resulting in microruptures in this latter and permitting also effecting a thermobonding integration of said film of glue 4 with said foam sheet 3.

Thus, as soon as the film of glue 4 is softened, it tends, because of the aspiration under vacuum, to penetrate under suction the interior of the surface cells of the polyurethane foam sheet 3 on which it is held. This phenomenon of suction produces, at the locations of the tiny cavities which constitute these surface cells, substantial elongation points of the film of glue 4, leading to microruptures or localized weakening of said film of glue 4 at these points. Thus, the film of glue 4 is microperforated and becomes microporous and hence also permeable, particularly to water vapor. Furthermore, it is integrated by thermobonding to the polyurethane foam sheet 3.

The moment of beginning heating of the composite 5 coincides with the end of expansion of the foam 8 in the mold the time of expansion of said foam 8 being known with precision having regard to the chemical composition of the initial foaming mixture 7.

This latter may be chosen as desired from numerous known formulations, such as, for example, isocyanate base foams of the type MDI or TDI.

According to another characteristic of the invention, the foam 8, expanded and in the course of gardening, is subjected by the microperforation of the initially fluid-tight film of glue 4, to an underpressure generated by aspiration under vacuum, in the interior of its cellular mass 9, giving rise to the rupture of the thinnest walls 10 of the cells 11 which constitute it, and the obtention, after polymerization, of a padding of foam 8 constituted by the cells 11 which are open and communicating.

It is precisely because the foam 8 is still in the course of hardening, and therefore still fragile, that the underpressure thus created within the cellular mass 9 ruptures the cells 11.

According to a preferred embodiment of the invention, the sheet of polyurethane foam 3 has cells which are open and communicating having a thickness between 1 and 3 millimeters and a density of 20 to 50 gr/dm$^3$, preferably 25 to 35 gr/dm$^3$. Similarly, the fluid-tight film of glue 4 is preferably polyurethane based and has a softening temperature between 60° and 80° C. as well as a thickness between 30 and 60 microns.

Such a film of glue 4 exists, on the one hand, under the trade name Platilon of the Atochem Company and, on the other hand, under the name Puro of the Guttacolle Company. However, it is also possible, within the scope of the invention, to use films of glue 4 which are polyamide based, copolymers or analogous materials, without modifying the course of the process which is the object of the invention. Moreover, the composite 5 could also, before being placed in the mold 1, be entirely prefabricated, which is to say already incorporating the film of glue 4.

Figure 4:
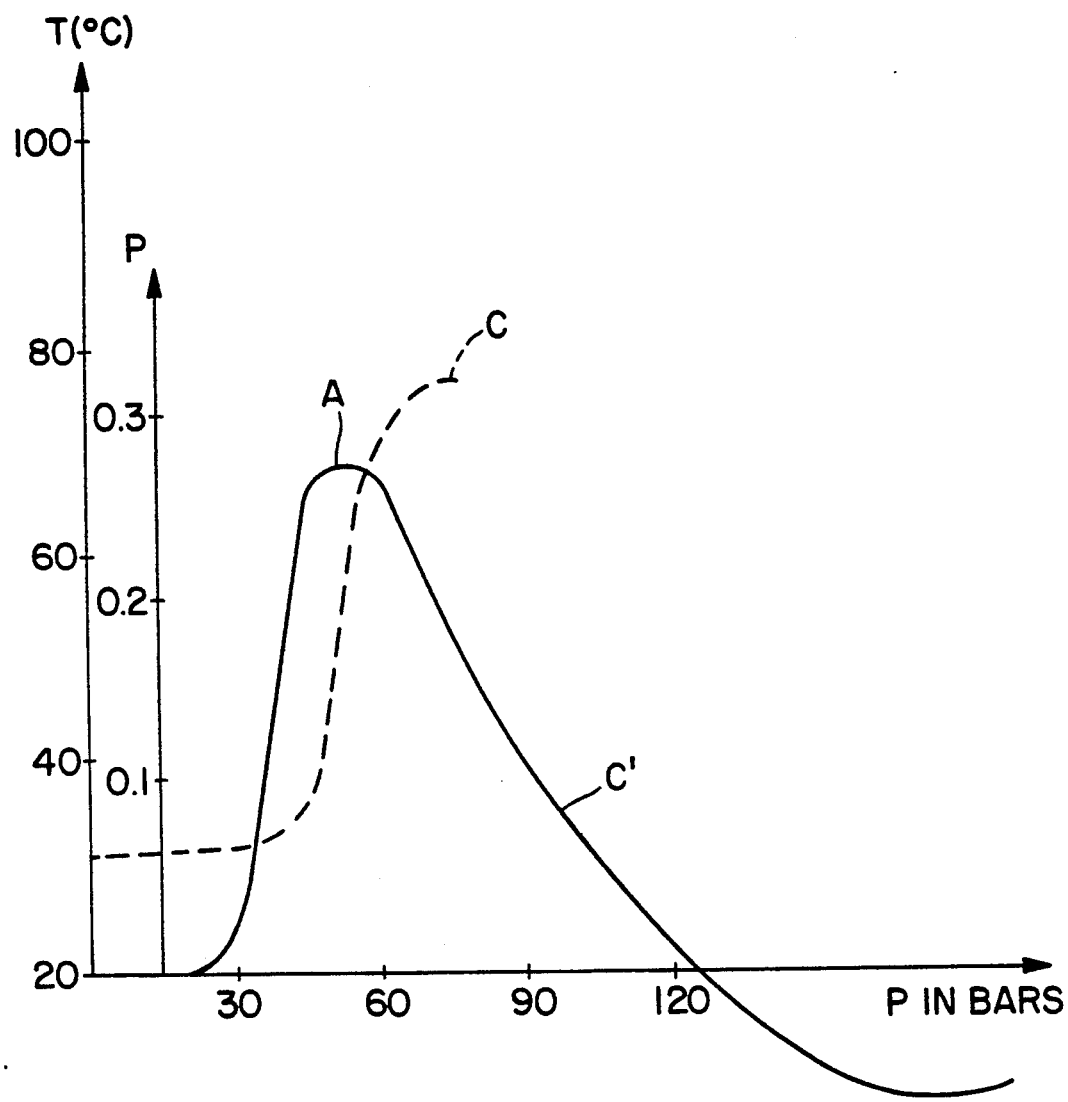
FIG. 4 is a diagram of the temperatures at the level of the composite and of the pressures within the mold, during practice of the process according to the invention.

As shown in FIG. 4 of the accompanying drawings, it is possible to follow, by placing suitable sensors in the mold 1, the course of the temperature T (curve C) at the level of the composite 5 and its incidence on the evolution of the pressure P (curve C') of the gases at the interior of the cellular mass 9 of the foam 8. The precise moment of the occurrence of microperforation of the film of glue 4 can thus be determined. Thus, it is a matter of the instant, marked on the curve C' by point A, at which the pressure P in the foam takes a sudden dive. Thus, as shown in FIG. 4 of the accompanying drawings, the operations of temperature increase of the composite 5, softening of the film of glue 4 and microperforation of this latter have a total duration of about 40 seconds.

Figure 2:
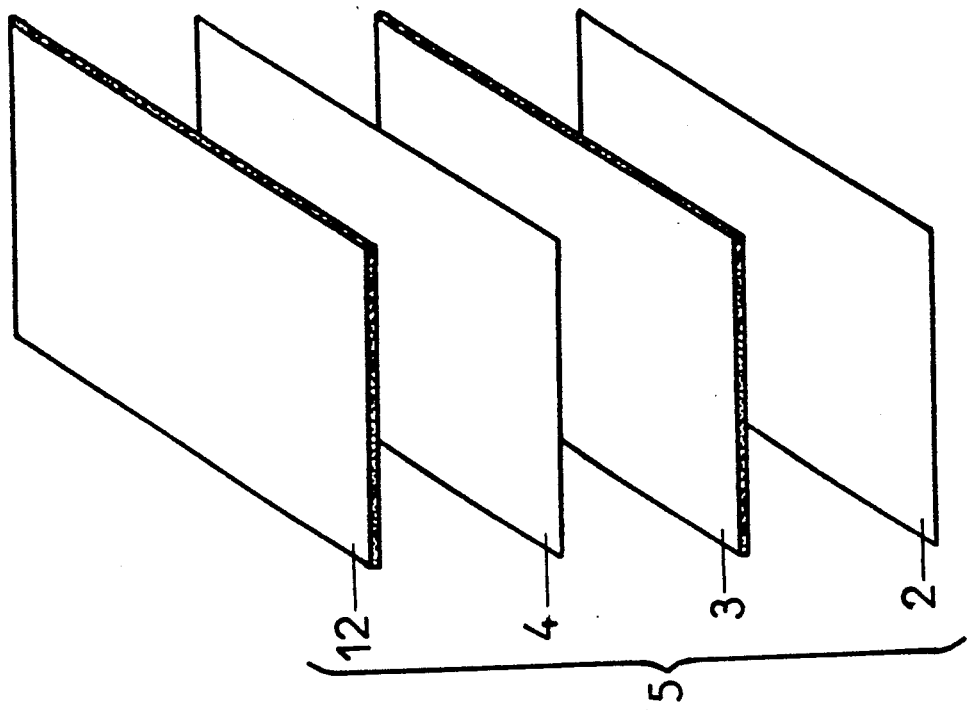
FIG. 2 is a view similar to that of FIG. 1 of a modified form of the composite.

According to a modified embodiment of the invention, shown in FIG. 2 of the accompanying drawings, the composite 5 comprises a supplemental sheet of polyurethane foam 12 disposed on the fluid-tight film of glue 4 and constituting a cellular barrier between said film 4 and the foaming mixture 7 during its expansion and solidification.

Thus, the presence of the sheet of polyurethane foam 12, preferably of a thickness of 1 to 2 mm, permits avoiding reinforcement of said film of glue 4 by the mold skin formed by the foam 8 during its expansion and hardening. There results an improved microperforation of said film of glue 4, giving rise to an improved permeability to water vapor at the surface of the padding of the resulting cushion.

According to a preferred embodiment of the process according to the invention, shown in FIGS. 3A, 3B and 3C of the accompanying drawings, the aspiration under vacuum is effected by means of a vacuum chamber 13 connected, for example, by means of a valve 14, to a vacuum source and communicating with the mold 1 thanks to multiple perforations of small dimensions provided in the internal wall 6 of this latter. The composite 5 is also clamped fluid-tightly by a frame 16 covered, after injection of the foaming mixture 7, through a head 17 of a casting machine, into the mold 1, by a cover 18. Moreover, the heating of the composite 5, for the microperforation of fluid-tight film 4, is preferably effected by means of printed circuits 19 integrated with the internal wall 6 of the mold 1. These printed circuits 19 can also be provided with multiple perforations permitting the vacuum to communicate with the interior of mold I. However, other types of heating systems integrated with the mold could be envisioned such as, for example, systems based on the circulation of vapor or hot fluid in the wall of the mold 1, or again, arrangements of electric heating resistance other than printed circuits 19.

The invention also has for its object a cushion obtained by practice of the process according to the invention, and comprising, after demolding, a padding of foam 8 provided with its textile covering and constituted of cells 11 which are open and communicating, said padding of foam 8 being surface permeable to water vapor and having no surface hardening due particularly to densification of the foaming mixture 7 at the level of the covering.

Thus, it results that any subsequent calendering of said padding is unnecessary Moreover, the permeability of the surface of the padding is such that it permits the passage of 1150 to 1250 grams of water vapor per square meter per 24 hours (Renault Method No. 1435). The addition of a supplemental sheet of foam 12 to the composite 5 before molding permits achieving even 1350 grams of water vapor per square meter per 24 hours. The comfort of the cushion provided according to the invention is accordingly remarkable.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. Process for the production of padding of polyurethane foam cast in situ in a textile covering, which comprises: disposing successively in a mold a textile overlaid by a foam sheet with cells that are open and communicating, then a fluid-tight film of glue so as to form a composite, said fluid-tight film of glue being of polyurethane base and having a softening temperatures between 60° and 80° C. and a thickness between 30 and 60 microns, holding by suction the composite thus obtained against an internal wall of the mold, said composite adapted to constitute the covering of a cushion, then casting in said mold a foaming mixture of polyurethane which expands and hardens after closing of said mold, and thereafter, effecting a microperforation of said fluid-tight film of glue by heating until softening and by the effect of suction to confer on it good permeability to water vapor and generating, by the effect of suction, an underpressure in the foam in the course of hardening, such that the resulting padding of foam will have, after polymerization and demolding, constituent cells that are open and communicating.

2. Process according to claim 1, wherein the sheet of polyurethane foam with cells that are open and communicating has a thickness between 1 and 3 millimeters and a density of 20 to 50 gr/dm$^3$.

3. Process according to claim 2, wherein the sheet of polyurethane foam has a density of 25 to 35 gr/dm$^3$.

4. Process for the production of padding of polyurethane foam cast in situ in a textile covering, which comprises: disposing successively in a mold a textile overlaid by a foam sheet with cells that are open and communicating, then a fluid-tight film of glue so as to form a composite, said composite comprising a supplemental sheet of polyurethane foam disposed on the fluid-tight film of blue, holding by suction the composite thus obtained against an internal wall of the mold, said composite adapted to constitute the covering of a cushion, then casting in said mold a foaming mixture of polyurethane which expands and hardens after closing of said mold, said supplemental sheet of polyurethane foam constituting a cellular barrier between said film of glue and the foaming mixture during its expansion and its hardening, and thereafter, effecting a microperforation of said fluid-tight film of glue by heating until softening and by the effect of suction to confer on it good permeability to water vapor and generating, by the effect of suction, and underpressure in the foam in the course of hardening, such that the resulting padding of foam will have, after polymerization and demolding, constituent cells that are open and communicating.

* * * * *

UNITED STATES PATENT AND TRADEMARK OFFICE
CERTIFICATE OF CORRECTION

PATENT NO.    : 5,294,386
DATED         : March 15, 1994
INVENTOR(S)   : Jacques ROTH et al.

It is certified that error appears in the above—identified patent and that said Letters Patent is hereby corrected as shown below:

On the title page, in Item [75], change the name of the second inventor from "Manigold Alain" to --Alain Manigold--.

Signed and Sealed this

Twelfth Day of July, 1994

Attest:

BRUCE LEHMAN

*Attesting Officer*   Commissioner of Patents and Trademarks